(12) United States Patent
Lam et al.

(10) Patent No.: US 10,039,057 B1
(45) Date of Patent: Jul. 31, 2018

(54) OPTIMIZED DEPLOYMENT OF BLE NETWORK AND POWER EFFICIENT AND SECURE MANAGEMENT OF DATA EXCHANGE BETWEEN BLE DEVICES

(71) Applicant: Hong Kong Applied Science and Technology Research Institute Co., Ltd., Shatin, New Territories (HK)

(72) Inventors: Tak Wing Lam, Kowloon (HK); Tak Fuk Wong, Kwai Chung (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 15/615,402

(22) Filed: Jun. 6, 2017

(51) Int. Cl.
*H04W 52/02* (2009.01)
*H04L 29/08* (2006.01)
*H04W 4/02* (2018.01)
*H04W 4/00* (2018.01)
*H04W 4/80* (2018.01)

(52) U.S. Cl.
CPC ... *H04W 52/0229* (2013.01); *H04L 29/08306* (2013.01); *H04W 4/023* (2013.01); *H04W 4/008* (2013.01); *H04W 4/80* (2018.02)

(58) Field of Classification Search
CPC . H04W 52/0229; H04W 4/008; H04W 4/023; H04W 4/80; H04W 84/18; H04W 8/005; H04L 29/08306; Y02D 70/144
See application file for complete search history.

(56) References Cited

U.S. PATENT DOCUMENTS

| | | | | |
|---|---|---|---|---|
| 2011/0021142 A1* | 1/2011 | Desai | | H04W 8/005 |
| | | | | 455/41.2 |
| 2013/0090061 A1* | 4/2013 | Linde | | H04W 8/005 |
| | | | | 455/41.2 |
| 2013/0165044 A1* | 6/2013 | Xie | | H04W 52/0229 |
| | | | | 455/41.2 |
| 2013/0178163 A1* | 7/2013 | Wang | | H04W 48/10 |
| | | | | 455/41.2 |
| 2013/0259230 A1* | 10/2013 | Polo | | H04L 63/0272 |
| | | | | 380/270 |

(Continued)

OTHER PUBLICATIONS

International Search Report and Written Opinion, PCT/CN2017/088096, dated Oct. 11, 2017, 10 pages.

*Primary Examiner* — Orlando Bousono
(74) *Attorney, Agent, or Firm* — Norton Rose Fulbright US LLP

(57) ABSTRACT

The present disclosure is related to a system for managing data exchanges between Bluetooth Low Energy (BLE) devices. The system includes a plurality of BLE devices. At least one BLE device is configured as a parent node and at least one BLE device is configured as a child node. The parent node is configured to receive a BLE packet, including data reported by the child node in a payload field of the BLE packet, and to use a location function to determine a location in the payload field for inserting data to be reported from the parent node. The parent node aggregates the data to be reported from the parent node and the data reported by the child node by inserting the data from the parent node into the determined location in the payload field of the BLE packet, and then broadcasts the BLE packet with the aggregated data.

20 Claims, 12 Drawing Sheets

(56) References Cited

U.S. PATENT DOCUMENTS

| | | | |
|---|---|---|---|
| 2014/0064212 A1* | 3/2014 | Ko | H04W 4/80 370/329 |
| 2014/0157135 A1* | 6/2014 | Lee | H04W 76/14 715/738 |
| 2014/0254433 A1 | 9/2014 | Abe et al. | |
| 2014/0378057 A1* | 12/2014 | Ramon | H04L 9/32 455/41.2 |
| 2015/0049871 A1* | 2/2015 | Xie | H04W 12/08 380/270 |
| 2015/0099467 A1* | 4/2015 | Kang | H04W 52/0229 455/41.2 |
| 2015/0215781 A1* | 7/2015 | Reed | H04L 9/3236 726/5 |
| 2015/0271625 A1* | 9/2015 | Chen | H04W 4/008 370/328 |
| 2015/0281877 A1* | 10/2015 | Walden | H04W 4/008 455/41.2 |
| 2015/0282088 A1* | 10/2015 | Weizman | H04W 52/0245 455/41.2 |
| 2015/0289283 A1* | 10/2015 | Ko | H04W 4/80 370/329 |
| 2015/0304824 A1* | 10/2015 | Syrjarinne | H04W 68/025 455/466 |
| 2015/0304941 A1* | 10/2015 | Syrjarinne | H04W 4/02 455/41.2 |
| 2015/0312858 A1* | 10/2015 | Kerai | H04W 52/0212 370/311 |
| 2015/0358759 A1* | 12/2015 | Jakusovszky | H04W 4/008 455/41.2 |
| 2015/0365208 A1* | 12/2015 | Hyun | H04W 4/80 370/310 |
| 2016/0037566 A1* | 2/2016 | Jakusovszky | H04W 8/005 455/41.2 |
| 2016/0066212 A1* | 3/2016 | Visweswara | H04W 28/065 370/474 |
| 2016/0088424 A1* | 3/2016 | Polo | H04W 4/80 455/41.1 |
| 2016/0095047 A1* | 3/2016 | Lee | H04W 4/80 370/328 |
| 2016/0100275 A1* | 4/2016 | Viswanadham | H04L 12/1886 455/41.2 |
| 2016/0100311 A1* | 4/2016 | Kumar | H04L 63/123 726/7 |
| 2016/0105788 A1* | 4/2016 | Helms | H04W 8/005 455/41.2 |
| 2016/0157048 A1* | 6/2016 | Kerai | H04W 84/18 455/41.2 |
| 2016/0183042 A1* | 6/2016 | Weizman | H04W 4/02 455/456.1 |
| 2016/0205496 A1* | 7/2016 | Su | H04W 4/008 455/41.1 |
| 2016/0210189 A1* | 7/2016 | Xhafa | H04B 7/26 |
| 2016/0227470 A1* | 8/2016 | Liu | H04W 52/0219 |
| 2016/0249292 A1* | 8/2016 | Viswanadham | H04L 12/1886 |
| 2016/0286340 A1* | 9/2016 | Zhu | H04W 4/008 |
| 2016/0309288 A1* | 10/2016 | Helms | H04W 8/005 |
| 2016/0381636 A1* | 12/2016 | Park | H04W 52/0229 370/311 |
| 2017/0013153 A1* | 1/2017 | Shin | H04W 76/10 |
| 2017/0034647 A1* | 2/2017 | Takeuchi | H04W 4/008 |
| 2017/0034856 A1* | 2/2017 | Takeuchi | H04L 12/1881 |
| 2017/0041868 A1* | 2/2017 | Palin | H04L 5/0048 |
| 2017/0180916 A1* | 6/2017 | Jakusovszky | H04W 4/70 |
| 2017/0181125 A1* | 6/2017 | Wiser | H03F 1/02 |
| 2017/0201441 A1* | 7/2017 | Choi | H04L 43/0852 |
| 2017/0201854 A1* | 7/2017 | Choi | H04W 4/008 |
| 2017/0201931 A1* | 7/2017 | Swanzey | H04W 48/10 |
| 2017/0208564 A1* | 7/2017 | Lee | H04W 64/003 |
| 2017/0223615 A1* | 8/2017 | Lee | H04W 76/18 |
| 2017/0265164 A1* | 9/2017 | Wiser | H04W 72/005 |
| 2017/0295284 A1* | 10/2017 | Song | H04W 4/80 |
| 2017/0303076 A1* | 10/2017 | Song | H04W 4/008 |
| 2017/0318453 A1* | 11/2017 | Raghu | H04W 4/80 |
| 2017/0318529 A1* | 11/2017 | Wiser | H03B 5/1228 |
| 2017/0325127 A1* | 11/2017 | Raghu | H04W 28/14 |

* cited by examiner

| DEVICE | SUB-TREE ID (GATEWAY=0) | CHILD ID (GATEWAY=0) | PARENT DEVICE BLUETOOTH ADDRESS | CHILD DEVICE BLUETOOTH ADDRESS | SIBLINGS CHILD ID | DESCENDANT CHILD ID | REAL TIME | DISTANCE TO GATEWAY (HOPS) | SECURE KEY |
|---|---|---|---|---|---|---|---|---|---|
| GATEWAY | 0 | 0 | - | A | | 1,2,3,4,5 | t | 0 | k |
| A | 1 | 1 | GATEWAY | B,C,D | | 2,3,4,5 | t | 1 | k |
| B | 1 | 2 | A | - | 3,4 | - | t | 2 | k |
| C | 1 | 3 | A | - | 2,4 | - | t | 2 | k |
| D | 1 | 4 | A | E | 2,3 | 5 | t | 2 | k |
| E | 1 | 5 | D | - | - | - | t | 3 | k |

FIG. 3

| | BYTE 0 SEQUENCE NO | BYTE 1 0 | BYTE 2 0 | BYTE 3-4 TYPE | BIT 40 41 42 43 44 45 46 47 48 49...247 0 0 0 0 0 0 0 0 0 1 |
|---|---|---|---|---|---|

THIS IS A PACKET BROADCASTED BY E: — 810

| | BYTE 0 SEQUENCE NO | BYTE 1 0 | BYTE 2 0 | BYTE 3-4 TYPE | BIT 40 41 42 43 44 45 46 47 48 49...247 0 0 0 0 0 0 0 1 0 1 |
|---|---|---|---|---|---|

THIS IS A PACKET BROADCASTED BY D: — 812

| | BYTE 0 SEQUENCE NO | BYTE 1 0 | BYTE 2 0 | BYTE 3-4 TYPE | BIT 40 41 42 43 44 45 46 47 48 49...247 0 0 0 0 0 1 0 0 0 0 |
|---|---|---|---|---|---|

THIS IS A PACKET BROADCASTED BY C: — 814

| | BYTE 0 SEQUENCE NO | BYTE 1 0 | BYTE 2 0 | BYTE 3-4 TYPE | BIT 40 41 42 43 44 45 46 47 48 49...247 0 0 0 1 0 0 0 0 0 0 |
|---|---|---|---|---|---|

THIS IS A PACKET BROADCASTED BY B: — 816

| | BYTE 0 SEQUENCE NO | BYTE 1 0 | BYTE 2 0 | BYTE 3-4 TYPE | BIT 40 41 42 43 44 45 46 47 48 49...247 0 1 0 1 0 1 0 1 0 1 |
|---|---|---|---|---|---|

THIS IS A PACKET BROADCASTED BY A: — 818

| | E TO D | D TO A | C TO A | B TO A | A TO GATEWAY |
|---|---|---|---|---|---|
| WITHOUT COMPRESSION | PACKET: E | PACKET: E,D | PACKET: C | PACKET: B | PACKET: A,B,C,D,E |
| WITH COMPRESSION | AN AGGREGATED PACKET | AN AGGREGATED PACKET | AN AGGREGATED PACKET | AN AGGREGATED PACKET | AN AGGREGATED PACKET |

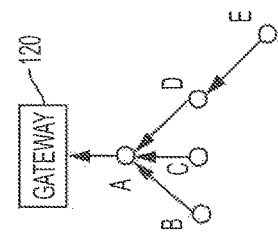

FIG. 8

DEVICE A ENCRYPTS THE PAYLOAD

DEVICE B DECRYPTS THE PAYLOAD

US 10,039,057 B1

OPTIMIZED DEPLOYMENT OF BLE NETWORK AND POWER EFFICIENT AND SECURE MANAGEMENT OF DATA EXCHANGE BETWEEN BLE DEVICES

TECHNICAL FIELD

The present invention relates to communication technology for Bluetooth Low Energy (BLE) devices, and more particularly to improvements for power efficiency and security of data exchanges between BLE devices.

BACKGROUND OF THE INVENTION

Bluetooth Low Energy (BLE), introduced as part of the Bluetooth 4.0 specification, is a low energy variant of the Bluetooth short range wireless standard. The purpose of BLE is to provide an extremely low power wireless system. For example, BLE device may be powered by a coin-size battery. The low cost, robustness, and data throughput provided by BLE devices has made BLE an attractive option for many applications in industrial, environmental, automotive, and medical environments.

BRIEF SUMMARY OF THE INVENTION

Although BLE devices are typically powered by a battery, they are expected to have a battery-lifetime of months, and even years. Thus, power efficiency may be an important factor when deploying BLE devices as part of a BLE network, where the BLE devices are configured to communicate with one or more other nodes of the BLE network. Another area of concern when establishing a BLE network is network load efficiency. As the number of BLE devices increases, the amount of data sent over the BLE wireless links also increases. This increase in traffic load may increase power consumption of the BLE devices, and may also negatively impact the network (e.g., slowing down the traffic flow and increasing collisions between transmissions within the BLE network). Additionally, security of communications transmitted over the BLE network is another area of concern, especially when the communications are broadcast communications, which may be intercepted by an unauthorized person.

Aspects of the present disclosure provide power efficient and secure techniques for data communication in a BLE network. In aspects, a method of deploying BLE networks and managing data exchange between BLE devices is provided. In an aspect of the method, BLE devices may be deployed in the BLE network according to a tree structure, and each BLE device in the network may be configured to determine a time slot for exchanging data in broadcast mode. During the determined time slot (e.g., a receive time slot and/or a transmit time slot), the BLE device may wake up to facilitate an exchange of data with one or more other devices of the BLE network, and outside the time slot, the BLE device may enter a sleep mode to conserve energy.

In further aspects of the method, devices of the BLE network may implement techniques for exchanging data with other devices of the BLE network in a manner that improves the network traffic efficiency. In these aspects, instead of sending raw data directly to a destination (e.g., an intended recipient of the transmission), devices operating in the BLE network may aggregate data received from other nodes of the BLE network (e.g., data received from a parent node or a child node of the tree structure) into a single broadcast packet. This may reduce the total number of packets required for providing data of the BLE devices, thereby reducing the amount of network traffic, while preserving the same amount of information.

In additional aspects of the method, the devices of the BLE network may implement techniques for encrypting and decrypting data exchanged between devices of the BLE network. Thus, it should be appreciated that the techniques and systems disclosed herein provide a technical solution to technical problems existing in the conventional industry practice of BLE networks. Furthermore, the techniques and systems disclosed herein embody a distinct process that provides an improvement to existing computerized systems and processes implementing BLE technology. In particular, according to aspects of the present disclosure, BLE devices and associated systems are provided new capabilities and functionality for managing deployment of BLE devices and networks, for aggregating data for multiple BLE devices in a manner that increases network traffic efficiency, and for securing data exchanges between BLE devices.

BRIEF DESCRIPTION OF THE DRAWINGS

For a more complete understanding of the present invention, reference is now made to the following descriptions taken in conjunction with the accompanying drawings, in which:

FIG. 3 shows a table illustrating an exemplary configuration information for a BLE network according to aspects of the present disclosure;

FIG. 8 is an illustrative diagram of a BLE broadcast packet aggregation according to aspects of the present disclosure;

DETAILED DESCRIPTION OF THE INVENTION

Figure 1:
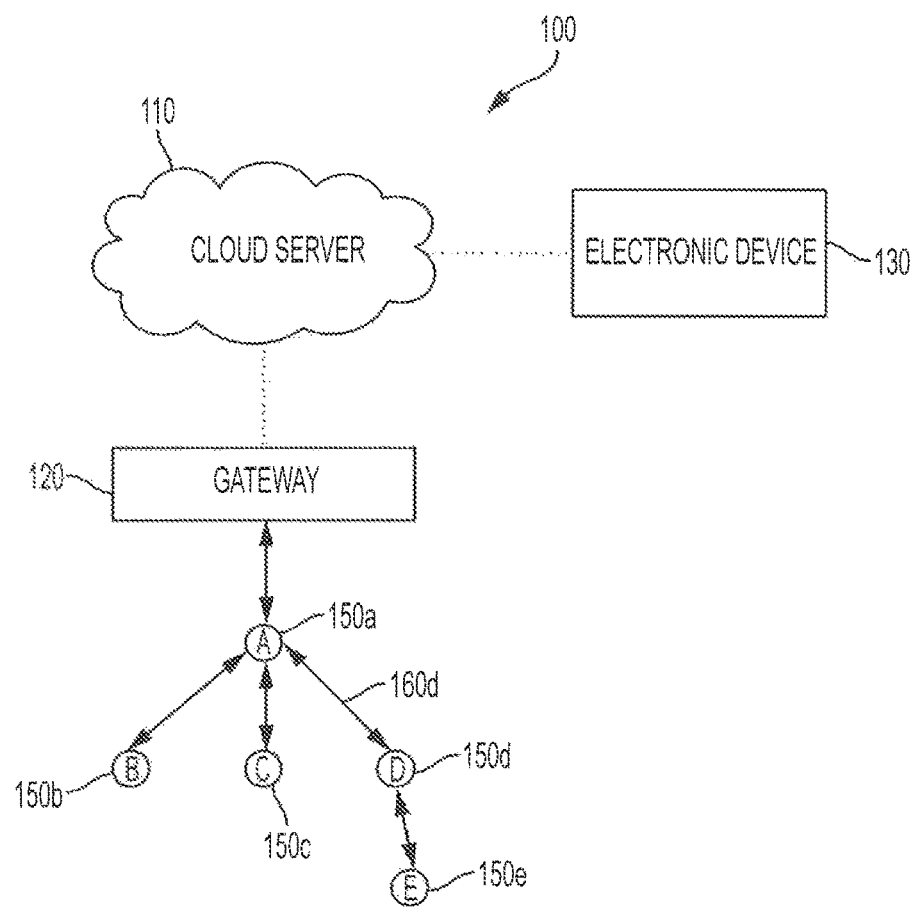
FIG. 1 illustrates a block diagram of an exemplary system configured with capabilities and functionality for deploying a BLE network and managing data exchange between BLE devices according to aspects of the present disclosure.

Referring to FIG. 1, a block diagram of an exemplary BLE network configured in accordance with aspects of the present disclosure is shown as system 100. System 100 may facilitate an optimized deployment of BLE devices within the BLE network, and may also provide a power efficient and secure transfer of data between the BLE devices themselves, as well as between BLE devices and the gateway, as described in detail below. As shown in FIG. 1, system 100 includes cloud server 110, gateway 120, electronic device 130, and BLE devices 150a-150e.

Cloud server 110 may include a processor, a memory, and a communication interface (not shown). The memory may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory may store instructions that, when executed by the processor, cause the processor to perform operations described in connection with cloud server 110 and system 100. In aspects, cloud server 110 may provide database functionality for various aspects of system 100. For example, cloud server 110 may store configuration information associated with a configuration of BLE devices 150a-150e, and other BLE devices (not shown in FIG. 1) deployed in system 100, as described in more detail below. Additionally, cloud server 110 may maintain, within its memory, one or more databases configured to store data generated by BLE devices operating within system 100, such as data generated by BLE devices 150a-150e. The communication interface of cloud server 110 may communicatively couple cloud server 110 to one or more other devices, such as gateway 120, electronic device 130, or other devices (not shown in FIG. 1) via wired or wireless communication links established according to one or more communication protocols or standards (e.g., a Bluetooth protocol, an Ethernet protocol, a transmission control protocol/internet protocol (TCP/IP), an Institute of Electrical and Electronics Engineers (IEEE) 802.11 protocol, and an IEEE 802.16 protocol, a 3rd Generation (3G) protocol, a 4th Generation (4G)/long term evolution (LTE) protocol, etc.).

In an aspect, cloud server 110 may be a single device configured to perform the operations described herein with reference to cloud server 110. Those of skill in the art would recognize that although FIG. 1 illustrates cloud server 110 as a single block, the implementation of cloud server 110 is not limited to a single component, and instead may be distributed over several components. For example, operations of cloud server 110 may be distributed over multiple devices configured to perform all or a portion of the operations of cloud server 110 in accordance with the present disclosure. Implementing cloud server 110 functionality over multiple devices may increase the reliability/uptime of system 100, e.g., if one of the multiple devices fails, cloud server 110 operations may continue running on other ones of the multiple devices.

Electronic device 130 may be a smartphone, a tablet computing device, a personal computing device, a laptop computing device, a desktop computing device, a computer system of a vehicle, a personal digital assistant (PDA), a smart watch, a global positioning system (GPS) device, etc. Electronic device 130 may include a processor, a memory, and a communication interface (not shown). The memory may include ROM devices, RAM devices, one or more HDDs, flash memory devices, SSDs, other devices configured to store data in a persistent or non-persistent state, or a combination of different memory devices. The memory may store instructions that, when executed by the processor, cause the processor to perform operations described in connection with electronic device 130.

In aspects, electronic device 130 may generate configuration information for configuring devices operating within system 100, such as gateway 120 and BLE devices 150a-150e. For example, as shown in FIG. 1, BLE devices 150a-150e, and gateway 120 are arranged into a tree structure, where devices of system 100 are arranged within the tree structure based on the configuration information generated by electronic device 130. In aspects, the tree structure may comprise one or more subtrees, where each subtree has gateway 120 as a root of the subtree, and has BLE devices arranged as nodes of the subtrees. As described in more detail below, electronic device 130 may be used to configure the tree structure by assigning particular BLE devices to specific locations within the subtrees. Additionally, as described in more detail below, electronic device 130 may be used to modify the configurations of one or more subtrees, such as to add BLE devices to one or more subtrees, remove BLE devices from one or more subtrees, relocate BLE from a first location within a subtree to a second location within the subtree, and/or reassign a BLE device from a first subtree to another subtree of system 100.

In aspects, electronic device 130 may generate the configuration information via inputs received from a user. For example, electronic device 130 may be configured to present a graphical user interface (GUI) that may be used to specify parameter values corresponding to a configuration of BLE devices 150a-150e. Particular parameters and parameter values for specifying the configuration of BLE devices operating within system 100 are described in more detail below with reference to FIG. 3. In aspects, the GUI provided by electronic device 130 may be provided via an application executing in electronic device 130, where the application may be stored as instructions within the memory of the electronic device 130. In aspects, upon generating the configuration information, electronic device 130 may store the configuration information at cloud server 110. In aspects, the configuration may also be stored in electronic device 130.

As briefly explained above, electronic device 130 may be utilized to alter the configuration of devices in system 100. For example, current configuration information may be retrieved from local memory of electronic device 130 and/or cloud server 110 and presented within the GUI at electronic device 130. It is noted that the current configuration information retrieved from cloud server 110 may be configuration information previously generated by electronic device 130 and stored at cloud server 110. Upon populating the GUI with the current configuration information, the configuration of the devices of system 100 may be altered, updated, or otherwise modified. Thus, the GUI provided by electronic devices 130 for generating the configuration information may be used to add new BLE devices to system 100, remove BLE devices from system 100, modify relationships between BLE devices within system 100, or other modifications, as described in more detail below. As the configuration of the devices within system 100 is updated, new configuration information may be provided to cloud server 110 and/or distributed to devices of system 100 to implement any changes to the currently deployed configuration of the devices within the system 100. In aspects, the GUI may be a web-based interface accessed via a web browser application executing on electronic device 130. In aspects, the web-based interface may be provided by cloud server 110. Additional aspects of configuring devices of system 100 based on configuration information are described in more detail below.

Gateway 120 may include a processor, a memory, and a communication interface. The memory may include ROM devices, RAM devices, one or more HDDs, flash memory devices, SSDs, other devices configured to store data in a persistent or non-persistent state, or a combination of different memory devices. The memory may store instructions that, when executed by the processor, cause the processor to perform operations described in connection with gateway 120. The communication interface of gateway 120 may include a Bluetooth interface to facilitate communication with BLE devices operating within system 100. Additionally, the communication interface of gateway 120 may include other communication interface configured to facilitate communication with cloud server 110, such as an IP-based communication interface, for example. In aspects, gateway 120 may be configured to act as an interface between cloud server 110 and BLE devices operating within system 100. In some aspects, gateway 120 provide a single point of entry into the one or more tree structures of system 100, and, as explained above, may be configured as the root of each of the one or more tree structures. In some aspects, gateway 120 may be a BLE-enabled device, such as a smartphone, a tablet computing device, a personal digital assistant (PDA), a switch, a router, a laptop computer, a desktop computer, etc.

Figure 2:
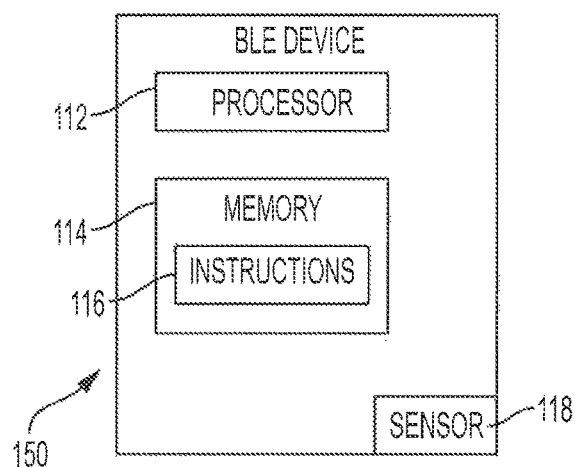
FIG. 2 illustrates aspects of an exemplary BLE device.

Referring briefly to FIG. 2, a diagram illustrating aspects of an exemplary BLE device is shown as a BLE device 150. As shown in FIG. 2, BLE device 150 may include processor 112 and memory 114. Memory 114 may include ROM devices, RAM devices, one or more HDDs, flash memory devices, SSDs, other devices configured to store data in a persistent or non-persistent state, or a combination of different memory devices. In aspects, memory 114 may store instructions 116 that, when executed by processor 112, cause processor 112 to perform operations of a BLE device operating according to aspects of the present disclosure, as described herein. In aspects, BLE device 150 may include a module or circuit (not shown) for providing real-time clock capabilities. In aspects, BLE device 150 may include one or more sensors 118. Sensor(s) 118 may be used to sense, observe, generate, and/or collect data, and the data may be reported to cloud server 110 via gateway 120 using data transmission techniques according to aspects of the present disclosure, as described in more detail below.

Referring back to FIG. 1, as briefly described above, the configuration information generated by electronic device 130 may be utilized to specify a configuration of BLE devices 150*a*-150*e*. In aspects, the electronic device 130 may be configured to provide the configuration information to cloud server 110 for distribution, via gateway 120, to BLE devices 150*a*-150*e*. In other aspects, electronic device 130 may be a BLE-enabled device, and the configuration information may be provided directly to BLE devices 150*a*-150*e* by electronic device 130.

As explained above, BLE devices operating within system 100 may be arranged in a tree structure based on configuration information. FIG. 3 shows a table that includes exemplary parameters configuration information for configuring subtrees according to aspects of the present disclosure. As shown in FIG. 3, the configuration information may include parameters associated with a Device Sub-tree ID, a Child ID, a Parent Device Address, a Child Device Address, a Siblings Child ID, a Descendants Child ID, a Real-Time value, a Distance to Gateway value, and a Security Key value (k). It is noted that although specific parameters and parameter values of configuration information for configuring devices into subtrees according to aspects of the present disclosure are illustrated with reference to FIG. 3, the specific parameters and parameter values illustrated in FIG. 3 have been provided for purposes of illustration, rather than by way of limitation, and that the system 100 may utilize additional parameters or less parameters in some aspects of the present disclosure. Thus, the present disclosure is not to be limited to the particular parameters and parameter values illustrated with reference to FIG. 3.

The Sub-tree ID parameter may specify, for a given node, an ID of the sub-tree to which that node may belong. For example, with reference to FIG. 1, the subtree formed by BLE devices 150*a*-150*e* may have a sub-tree ID of 1. As also seen in FIG. 3, the sub-tree ID for nodes A-E is 1. In some aspects, another BLE device (not shown) may be added and configured as an additional child node to gateway 120. In these aspects, the additional child node, and any subsequent nodes that are descendants of the additional child node, may be configured as part of a second subtree with a sub-tree ID of 2.

The Child ID for a particular node may specify the ID of that particular node. For example, the child IDs of nodes A, B, C, D, and E, corresponding to BLE devices 150*a*-150*e*, respectively, are 1, 2, 3, 4, and 5, respectively. In some aspects, the Child ID for gateway 120 may be defaulted to 0.

The Parent Device Address parameter for a child node may specify an address of each child node's parent node device. For example, a value of the Parent Device Address parameter for node A, e.g., BLE device 150*a* of FIG. 1, may specify the address of the gateway, e.g., gateway 120 of FIG. 1, a value of the Parent Device Address parameter for node B, e.g., BLE device 150*b* of FIG. 1, may specify the address of node A, e.g., BLE device 150*a* of FIG. 1, a value of the Parent Device Address parameter for node C, e.g., BLE device 150*c* of FIG. 1, may specify the address of node A, e.g., BLE device 150*a* of FIG. 1, a value of the Parent Device Address parameter for node D, e.g., BLE device 150*d* of FIG. 1, may specify the address of node A, e.g., BLE device 150*a* of FIG. 1, and a value of the Parent Device Address parameter for node E, e.g., BLE device 150*e* of FIG. 1, may specify the address of node D, e.g., BLE device 150*d* of FIG. 1. In aspects, the address value of the Parent Device Address parameter may be specified as a Bluetooth address, but the address may also be specified in any format addressable by a BLE device.

The Child Device Address parameter for a particular node may specify the addresses of all child nodes of the particular node. For example, for node A, the Child Device Address field of the configuration information may identify addresses for nodes B, C, D, which are child nodes of node A. In aspects, the Child Device Address parameter may specify multiple addresses, such as when a node has multiple child nodes, or may specify a single address, such as when a node has a single child node, e.g., node D has a single child node (node E). Additionally, a null value may be used to specify that a node may not have any child nodes, as shown with respect to node E. It is noted that the address values, such as "A, B, C, D, E" shown in the table of FIG. 3 represent the address of the respective BLE device nodes, which may be specified as a Bluetooth address, or another format addressable by a BLE device.

The Sibling Child ID parameter for a particular node may specify the ID of all sibling nodes of the particular node, where a sibling node to a particular node is a node that is a child node of the same parent node as the particular node. For example, node B is a child node of node A. Nodes C and D (with Child ID of 3 and 4, respectively) are also child nodes of node A. In this case, the Siblings Child ID for Node B may include the IDs for node C and D, namely 3 and 4. In the case of nodes A and E, which are shown without sibling nodes, a null value may be used to specify that a node may not have any sibling nodes. In aspects, a tree structure may include multiple subtrees. In these aspects, the top BLE device of any subtree may be a sibling node to the top BLE devices of the other subtrees, and the IDs of the other top BLE devices may be included in the Siblings Child ID field of the top BLE device.

The Descendant Child ID parameter for a particular node may specify the ID of all child nodes of the particular node, and also the ID of subsequent child nodes of any child nodes of the particular node. For example, node A has three child nodes, nodes B, C, and D, and node D also has a child node, node E. In this case, the value for the Descendant Child ID parameter for Node A may specify the IDs for nodes B, C, and D, and also node E, namely IDs 2, 3, 4, and 5.

It should be noted that the parent-child relationship of BLE device nodes discussed herein has been described as relative to the gateway. That is, for two BLE devices that have been configured as parent and child nodes, the BLE device that is closer to the gateway would be considered the parent. For example, with reference to FIG. 1, BLE devices 150d and 150e have been configured as parent and child nodes. BLE device 150d is closer to the gateway and is configured as the parent node.

The Real Time parameter may be used to specify a synchronization value. The synchronization value may be used to time synchronize devices operating within system 100. In aspects, the Real Time parameter may be a number of milliseconds that may have elapsed since a pre-defined time at the time of configuring a BLE device for operations within system 100. For example, the Real Time parameter for a BLE device may indicate the number of milliseconds that have elapsed since Jan. 1, 1970, at the time the BLE device is configured. For example, for a BLE device configured at 1 minute past Jan. 1, 1970, the Real-Time parameter of the BLE device may have a value of 60,000 (milliseconds). In some aspects, if a BLE device has not been synchronized, the Real-Time parameter will be a default value, for example −1.

The Distance to Gateway parameter may specify the number of hops required to reach the gateway from a particular node. For example, with reference to FIG. 1, a packet sent from node E would hop to node D, then to node A, and then to the gateway, for a total of 3 hops. From node C, a packet would only need 2 hops to reach the gateway.

The Secure Key parameter may specify a shared key that may be used for encrypting and decrypting transmissions within the system 100, as described more in depth below. The shared key may be stored in each BLE device in the BLE network. In aspects, the shared key may be a 128-bit encryption key. In some aspects, the system 100 may include multiple subtrees, and each subtree may utilize the same shared key (k). In some aspects, when system 100 includes multiple subtrees the Secure Key parameter may be used to specify different shared keys for different subtrees. For example, access to the tree structure by external systems may be managed by configuring a subtree for the external systems and specifying a shared key for that subtree, while specifying a different shared key for other subtrees.

As described in more detail below, configuring devices of system 100 according to a tree structure may enable power savings, improved network load efficiency, and improved data security. However, configuration of two BLE devices as parent and child nodes may not be decided arbitrarily. In aspects, two BLE devices may be configured as parent and child if a signal strength between the two BLE devices satisfies a threshold. In aspects, the threshold may be pre-determined, or may be based on system requirements at the time of deployment. For example, in some aspects, the threshold may be associated with a Received Signal Strength Indicator (RSSI) and may specify a threshold value of −100 dBm. Thus, two BLE devices may be assigned as parent-child within a subtree of system 100 when the RSSI between the two BLE devices is ≥−100 dBm. It is noted that using RSSI as a parameter for assigning nodes as parent-child has been provided for purposes of illustration, rather than by way of limitation, and other criteria may be utilized to arrange nodes within subtrees of system 100. For example, nodes within subtrees of system 100 may be arranged such that the number of child BLE devices per parent BLE device is evenly distributed. When a parent BLE device has a higher number of child BLE devices, the parent BLE device consumes energy at a faster rate, causing hot-spots to be introduced into the system 100. Thus, load balancing the child BLE devices to evenly distribute them across the parent BLE devices reduces the likelihood of hot-spots being introduced and improves the power efficiency of system 100.

In aspects, a size of data generated by each BLE device may be accounted for when assigning BLE devices to the one or more subtrees of system 100. For example, in aspects, a maximum number of BLE devices that may be supported by one of the subtrees of system 100 may be determined based on the following: (s—h)/d, where s corresponds to a size (in bits) of a packet, h corresponds to a size (in bits) of a header of the packet, and d corresponds to a size of data (in bits) per BLE device. Accounting for a size of the data generated by each BLE device enables BLE devices to be assigned to subtrees in a manner that allows efficient use of a data payload of each data packet. For example, as described in more detail below, a packet transmitted in system 100 may include a data payload field used to carry data generated by one or more of the BLE devices of a subtree of system 100, where the data payload field may have a particular size. By accounting for the size of data generated by the BLE devices when assigning BLE devices to subtrees of system 100, BLE devices may be assigned to subtrees of system 100 such that, for a particular subtree, there is enough space in the data payload field to carry data generated by all BLE devices of the particular subtree.

Additionally, when establishing the subtrees of system 100, it may be important to minimize the total number of nodes in any particular subtree, and to minimize the number of hops required to reach the gateway from any particular node. By optimizing the BLE device parent-child node pairs, a particular area may be covered using a minimum number of BLE devices by. When the signal strength of BLE device parent-child pairs satisfies the threshold by a significant margin, the arrangement may be changed by removing a BLE device, or a plurality of BLE devices, thereby resulting in a lower signal strength between the remaining BLE device parent-child pairs, thereby minimizing the number of BLE devices within the system 100. In these aspects, the signal strength between the BLE device parent-child pairs may be determined in the field, or estimated based on a proposed deployment. In aspects, the threshold may be determined based on system requirements, such as budgetary requirements, type of equipment used, geographic requirements, space requirements, power requirements, etc. Additionally, the determination of whether a signal strength of a BLE device parent-child pair is satisfies the threshold by the significant margin may be determined based on a percentage of the threshold value, e.g., 10%, 30%, etc., a predetermined value, or some other value based on system requirements at the time of the deployment.

Referring back to FIG. 1, BLE devices 150a-150e may be configured to communicate with each other. As shown in FIG. 1, each of devices 150a-150e may establish communication with another BLE device. For example, BLE device 150d may communicate with BLE device 150a, where BLE device 150a may be a parent node with respect to BLE device 150d. In some aspects, BLE devices 150a-150e may also be configured to communicate with gateway 120. It is noted that communication between BLE devices 150a-150e and between BLE devices 150a-150e and gateway 120 may be via a Bluetooth protocol. Bluetooth technology, such as BLE, is generally used for short-range, low-power device-to-device communications. In system 100, deployment of BLE devices 150a-150e may be intended to provide a coverage area, e.g., a shopping mall, a large number of BLE devices is required. According to the BLE specification, BLE devices may communicate in two modes: a Broadcast mode and a Connection mode. Broadcast mode is a single-directional data broadcast, in which a BLE device acts as broadcaster and advertises data. Broadcast mode is more power efficient for sending data than connection mode, which involves a bi-directional data exchange that includes discovery and connection procedures. To reduce power consumption of devices in system 100, BLE devices 150a-150e may be configured to communicate data using the Broadcast mode.

In a BLE stack, a broadcaster is an advertiser that is non-connectable, and an observer is a device that scans for advertisements, but does not initiate connections in order to receive data. In broadcast mode, a BLE device may act as broadcaster and advertises a broadcast data packet having a payload field for carrying data. In aspects, the payload field may have a size of 31 bytes. In some aspects, the payload field may have a size that is greater than, or less than 31 bytes. The payload field of the broadcast data packet may be user defined, such as data generated by a BLE device. In the broadcast mode, other BLE devices may act as observers and may scan for data transmissions advertised by a broadcast of another BLE device. In the broadcast mode, there is no discovery or connection procedure.

In aspects, data broadcast and/or received within system 100 may include data generated by one or more of BLE device 150a-150e. For example, as explained above, BLE devices 150a-150e may include sensors, which may be used to generate data that may be communicated to cloud server 110 for storage and/or access by one or more other systems (not shown in FIG. 1). In aspects, the data generated by BLE devices 150a-150e may include status data, environmental data, pressure data, temperature data, humidity data, health-related data, fitness related data, proximity data, power data, etc. Those of ordinary skill in the art will appreciate that there are numerous other types of data may be sensed and/or generated by a BLE device and that the exemplary types of data described herein are provided for purposes of illustration, rather than by way of limitation.

As explained above, gateway 120 and BLE devices 150a-150e may be deployed in a tree structure arrangement optimized for power and traffic load efficiency. In the tree structure illustrated in FIG. 1, gateway 120 may be configured as the root node of the tree. Having a single point of entry into the tree structure, and similarly having a single point of egress, may allow for a more efficient data exchange from/within the tree, as a tree structure may comprise multiple nodes and multiple subtrees.

As further shown in FIG. 1, each of BLE devices 150a-150e may be configured as nodes of the tree structure. For example, BLE devices 150a-150e may be configured as nodes A-E, respectively. In some aspects, a BLE device of BLE devices 150a-150e may be configured as a parent node with respect to other BLE devices, and may be a child node with respect to other BLE devices. For example, BLE device 150a is configured as parent node A, and BLE devices 150b-150d are configured as child nodes B, C, and D. BLE device 150e may be configured as child node E with respect to node D. Furthermore, BLE devices 150a-150e may also be configured as child nodes of gateway 120. For example, BLE device 150a is configured a child node A of gateway 120. In some aspects, a BLE device may be both a parent node and a child node. For example, BLE device 150d is configured as node D. As shown in FIG. 1, node D is a parent node to node E, and it is also a child node to node A. In aspects, a BLE device may be configured to have multiple child nodes, but a BLE device may not be configured to be a child to multiple parent nodes.

In aspects, data may be communicated bi-directionally within system 100. For example, parent node A and child node D may establish communication 160d to exchange data. It is noted that, thanks to the technique disclosed herein, the bi-directional communication between BLE devices of a parent-child pair may be accomplished without using the power inefficient BLE connection mode, but rather such communication is accomplished using a broadcast scheme that employs the BLE broadcast mode.

In aspects, data exchanges between BLE devices using the broadcast mode may be managed to improve power efficiency of the BLE network. During operation, each BLE device may use a schedule function to calculate a scheduled time slot for exchanging data with other BLE devices. In these aspects, each BLE device may wake up at the calculated scheduled time slot to receive data from child or parent nodes, or to transmit data to child or parent nodes. At times outside the calculated scheduled time slot, the BLE devices remain in a sleep mode to conserve power.

In aspects, the data exchanged during the scheduled time slot may include commands transmitted from the gateway to the BLE devices. For example, with reference to FIG. 7b, example commands are shown. In one aspect, type section 750 of user defined payload 700 may be used to specify a command. For example, a value of "0x1000" may be used to specify a "get battery status" command, a value of "0x2000" may be used to specify a "get humidity" command, and/or a value of "0x3000" may be used to specify a "get temperature" command. It is noted that the particular commands and values used to specify those commands have been provided for purposes of illustration, rather than by way of limitation, and that other commands and command values may be used to specify commands to the BLE devices of system 100. As further discussed below, in some aspects, the command may be addressed to a particular BLE device, a subset of BLE devices, or in some cases all BLE devices. In some aspects, the data transmitted from child nodes to the parent nodes may include data from a BLE device of a child node to be reported to the gateway. In some aspects, the data reported from child nodes to the parent nodes may be in response to a command. Techniques for aggregating data transmitted by the BLE devices into a single broadcast packet for the gateway are discussed in depth below.

In aspects, the schedule function for determining the scheduled time slot for exchanging data that includes commands transmitted from the gateway to the BLE devices may be defined by the following equation:

$$Tn=Tg+Th*dn \qquad \text{(Equation 1)}$$

where:
Tn=the scheduled time slot for BLE device n;
Tg=a predefined time for transmitting the data from the gateway;
Th=a time limit allowed for data exchange between any pair of BLE devices; and
dn=number of hops between BLE device n and the gateway.

Equation (1) may be used whenever data to be exchanged between a pair of BLE devices, which may include the gateway, includes command data from the gateway. Equation (1) may be used to determine a scheduled time slot for transmitting the data to a child node, and may also be used to determine a scheduled time slot for receiving the data from a parent node.

Figures 4A, 4B:
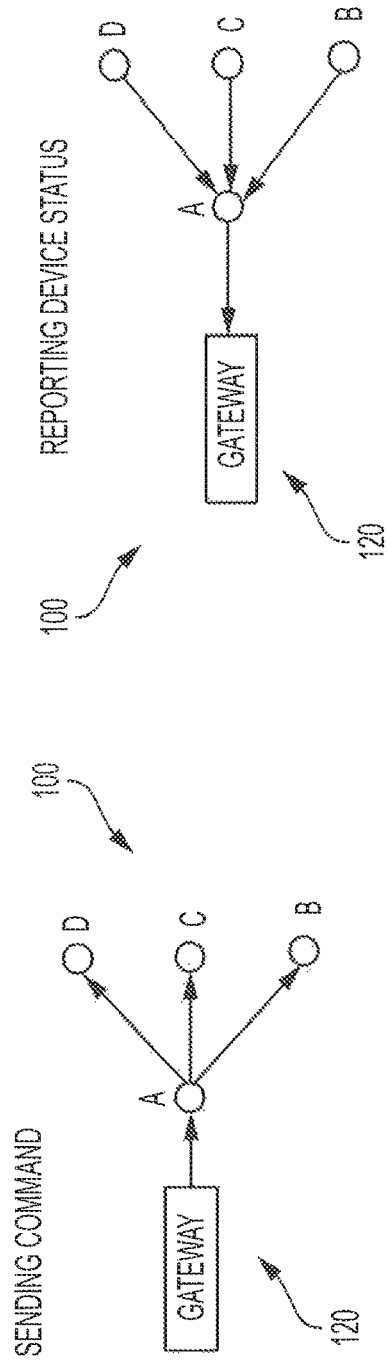
FIG. 4a illustrates an exemplary application of a schedule function for determining the scheduled time slot for exchanging data between BLE devices according to aspects of the present disclosure.
FIG. 4b illustrates another exemplary application of a schedule function for determining the scheduled time slot for exchanging data between BLE devices according to aspects of the present disclosure.

FIG. 4a illustrates an application of equation (1) to a BLE network where data that includes command data from gateway 120 is to be exchanged between the nodes A-D of system 100. In this illustrated example, the predefined time for transmitting the data from gateway 120, Tg, is 3:00 am. The time limit allowed for data exchange between any pair of BLE devices, Th, is 1 minute. In this example, equation (1) is applied to gateway 120 and to node A. For gateway node 120, the equation yields a scheduled time slot of 03:00+0:01*0=03:00, 3:00 am. Thus, gateway 120 transmits the data to child node A from 3:00 am to 3:01 am. For node A, the equation yields a scheduled time slot of 03:00+0:01*1=03:01=3:01 am. Thus, node A transmits the data to child nodes B-D during scheduled time slot of 3:01 am to 3:02 am. It is noted that outside the scheduled time slot from 3:01 am to 3:02 am, except for other scheduled time slots for transmitting or receiving other data, node A is in sleep mode, and only wakes up during its scheduled time slot to transmit the data from gateway 120 to nodes B-D.

It is noted that the example in FIG. 4a illustrates the data exchange in the downstream direction, i.e., starting from gateway 120 and flowing toward child nodes. Because nodes B, C, and D do not have child nodes themselves, a scheduled time slot for transmitting the data for each of these nodes does not need to be determined, as no transmission is made from these nodes.

As noted above, a node may use equation (1) to calculate a scheduled time slot for transmitting gateway command data to child nodes, and in some aspects, a node may also use equation (1) to calculate a scheduled time slot for receiving gateway command data from a parent. In these aspects, a node may sleep outside the scheduled time slot for receiving the data, except for other scheduled time slots for transmitting or receiving other data, and may only wake up during its scheduled time slot to receive the data from a parent node. For example, nodes B-D, having a distance to gateway of 2, may use equation (1) to calculate a scheduled time slot for receiving the data that includes command data from gateway 120 transmitted from the gateway at 3:00 am. In this example, equation (1) applied to nodes B-D yields a scheduled time slot of 03:00+0:01*1=03:01=3:01 am for receiving the data from parent node A. Nodes B-D may sleep outside the schedule time slot and wake up at 3:01 am to receive the data from parent node A.

In some aspects, a schedule function may be used for determining a scheduled time slot for exchanging data that includes data from a BLE device of a child node to be reported to the gateway. In these aspects, the schedule function may be defined by the following equation:

$$Tn=Tg-Th*dn \qquad \text{(Equation 2)}$$

where:
Tn=the scheduled time slot for BLE device n;
Tg=a predefined time for receiving the data at the gateway;
Th=a time limit allowed for data exchange between any pair of BLE devices; and
dn=number of hops between BLE device n and the gateway.

Equation (2) may be used whenever data to be exchanged between a pair of BLE devices, which may include the gateway, includes data from a BLE device to be reported to the gateway. Equation (2) may be used to determine a scheduled time slot for transmitting the data to a parent node, and may also be used to determine a scheduled time slot for receiving the data from a child node. Status data, as used herein, may refer to BLE device data reported by a BLE device to a gateway. Status data may include data collected by the BLE device, such as data (e.g., humidity, pressure, temperature, etc.) generated by one or more sensors of the BLE device, and may include a status condition of the BLE device, such as a status of a battery of the BLE device or other information associated with hardware and/or software of the BLE device.

FIG. 4b illustrates an application of equation (2) to a BLE network where data that includes data from nodes A-D to be reported to gateway 120 is to be exchanged between the nodes of system 100. In this illustrated example, the predefined time for receiving the data at gateway 120, Tg, is 7:00 am. The time limit allowed for data exchange between any pair of BLE devices, Th, is 1 minute. In this example, equation (2) is applied to nodes A-D. For nodes B-D, which have the same distance to gateway of 2, the equation yields a scheduled time slot of 07:00-0:01*2=06:58=6:58 am. Thus, nodes B-D transmits the data to parent node A from 6:58 am to 6:59 am. For node A, the equation yields a scheduled time slot of 07:00-0:01*1=06:59=6:59 am. Thus, node A transmits the data, which may include data from nodes B-D, to gateway 120 during scheduled time slot of 6:59 am to 7:00 am. It is noted that outside their scheduled time slots, except for other scheduled time slots for transmitting or receiving other data, nodes A-D may be in sleep mode, and may only wake up during their scheduled time slot to transmit the data to their respective parent node. It is also noted that the example in FIG. 4b illustrates the data exchange in the upstream direction, i.e., flowing toward gateway 120. Because gateway 120 does not have a parent node, a scheduled time slot for transmitting the data from gateway 120 does not need to be determined.

In the example illustrated in FIG. 4b, nodes B-D are sibling nodes. These nodes are child nodes of node A. In this situations, there may be a potential for packet collision, as every node B-D will be scheduled to transmit data to parent node A at the same time. To avoid this, packet collision avoidance may be implemented. In some aspects, packet collision avoidance may include adding a random time to the determined scheduled time slots for each of the sibling nodes. In these aspects, the added random time may result in different scheduled time slots for the sibling nodes. In some aspects, the random time added to the scheduled time slots of the sibling nodes may be any value in the range of 0 to 3,000 ms.

As noted above, a node may use equation (2) to calculate a scheduled time slot for transmitting data to parent nodes, and in some aspects, a node may also use equation (2) to calculate a scheduled time slot for receiving data from a child node. In these aspects, a node may sleep outside the scheduled time slot for receiving the data, except for other scheduled time slots for transmitting or receiving other data, and may only wake up during its scheduled time slot to receive the data from a child node. For example, node A may use equation (2) to calculate a scheduled time slot for receiving the data from nodes B-D to be reported to gateway 120. The data is scheduled to be received at gateway 120 at 7:00 am. In this example, equation (2) applied to node A yields a scheduled time slot of 07:00-0:01*2=06:58=6:58 am for receiving the data from child nodes B-D. Nodes A may sleep outside the schedule time slot and wake up at 6:58 am to receive the data from child nodes B-D.

Figure 5:
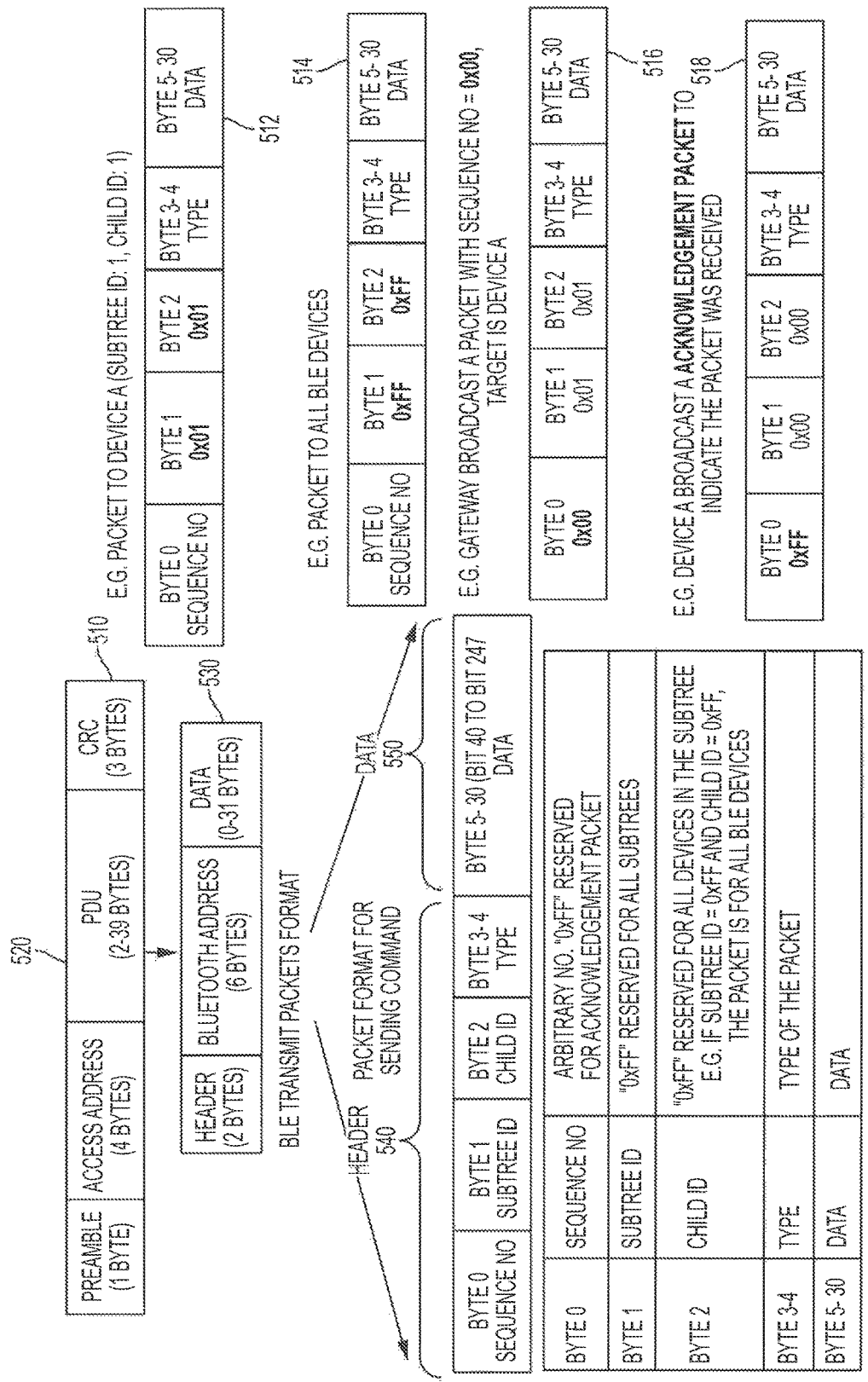
FIG. 5 shows an exemplary format for a broadcast packet in accordance with the aspects of the present disclosure.

FIG. 5 illustrates an example of a BLE broadcast packet 510 transmitted in accordance to aspects of the present disclosure. In some aspects, BLE broadcast packet 510 may include a preamble, an access address, PDU field 520, and a CRC field. PDU field 520 may include a header, a MAC address, and data field 530. Data field 530 may include header 540 and payload data 550. In some aspects, header 540 may define parameter fields that may be used to address BLE broadcast packet 510 to a particular BLE device, or to all BLE devices in the BLE network. Header 540 may comprise 5 bytes and may include a one-byte sequence field in byte 0, which may include an arbitrary number. A value of "0xFF" in the sequence field may be reserved for acknowledgement packets. In aspects, byte 1 of header 540 may be used to define a destination subtree ID. For example, a value of "0x01" in the destination subtree ID field may specify subtree 1 as the destination of BLE broadcast packet 510. In some aspects, a value of "0xFF" in the subtree ID field may be reserved for specifying all subtrees as destination subtree.

Byte 2 of header field 540 may be used to define a destination child ID. For example, a value of "0x01" in the destination child ID field may specify node A, having child ID of 1, as the destination of BLE broadcast packet 510. It is noted that, in some aspects, the child ID is defined for the subtree specified in the subtree ID field. In some aspects, a value of "0xFF" in the child ID field may be reserved for specifying all child IDs as destination nodes. Bytes 3-4 of header 540 specify a type of the packet. In some aspects, the type of packet may be a command, as described above with reference to FIG. 7b. Payload data 550 may be used to include, and aggregate, data for transmission to gateway 120 and cloud server 110, or to include gateway command data to be transmitted to the BLE devices.

By defining a destination subtree ID and a destination child ID, the format of BLE broadcast packet 510 allows for addressing BLE broadcast packet 510 to a specific BLE device, by specifying the subtree ID and the child ID of the destination BLE device, despite the packet having been transmitted in broadcast mode. Additionally, by reserving an "all subtrees" and "all Child IDs" value, the broadcast functionality of a broadcast mode is preserved. For example, as shown in FIG. 5, BLE broadcast packet 512 is individually addressed to BLE device A, which has a Child ID of 1 and belongs to subtree 1, by specifying subtree ID="0x01", and Child ID="0x01". BLE broadcast packet 514 may be addressed to all BLE devices in the BLE network tree structure by specifying subtree ID="0xFF", and Child ID="0xFF".

FIG. 5 also illustrates BLE broadcast packet 516 from the gateway, which has a sequence value of 0x00 and is individually addressed to BLE device A. In response to receiving BLE broadcast packet 516, device A broadcasts BLE broadcast packet 516, individually addressing the gateway, to acknowledge receipt of BLE broadcast packet 516, by specifying a value of "0xFF" in the sequence field.

Figure 6A:
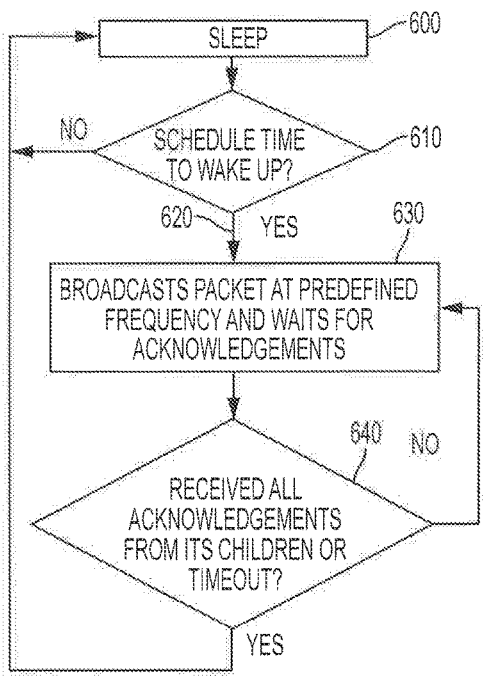
FIG. 6a shows diagrams illustrating example blocks executed to implement aspects of the present disclosure.
Figure 6B:
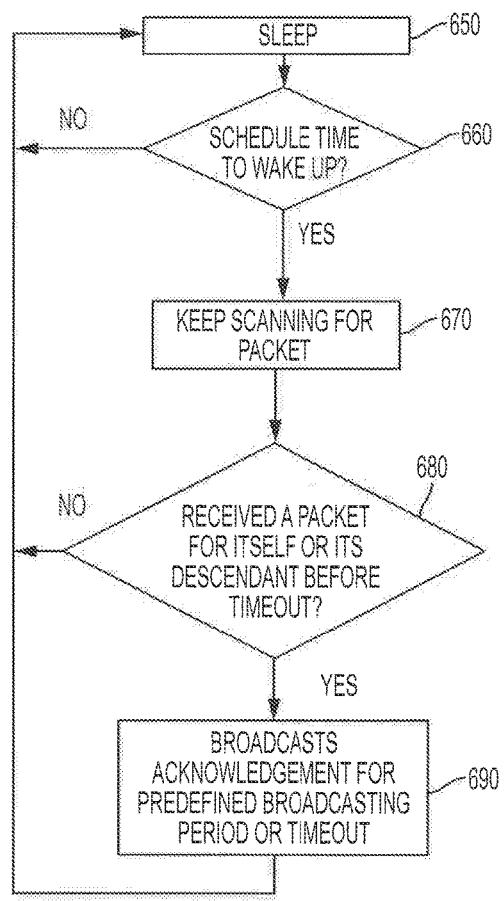
FIG. 6b shows diagrams illustrating example blocks executed to implement aspects of the present disclosure.

FIGS. 6a and 6b are diagrams illustrating example blocks executed to implement one aspect of the present disclosure. The procedure according to this example aspect details steps for exchanging data between nodes of a BLE network that includes command data from a gateway. It is noted that the procedure according to the example aspect illustrated by FIG. 6a may be implemented at a node scheduled to transmit data to another node. For example, the procedure in FIG. 6a may be implemented by parent node A scheduled to transmit data to its child nodes B, C, and D. Additionally, the procedure according to the example aspect illustrated by FIG. 6b may be implemented at a node scheduled to receive data from another node. For example, the procedure in FIG. 6b may be implemented by a child node, any of nodes B, C, and D, scheduled to receive data from parent node A. The parent node A may transmit the data to child nodes B, C, and D in accordance to the procedure illustrated in FIG. 6a.

At block 600, BLE device A may be in sleep mode. Sleep mode as used herein may refer to a device status of lowered power usage. In some aspects, sleep mode may include powering down all functions of the BLE device, or may include power down only select functions, e.g., communication functions, data collection functions, etc. BLE device A may have data to be transmitted to its child nodes B, C, and D, and may also have a scheduled time slot for transmission of the data. At block 610, while in sleep mode, BLE device A determines whether the scheduled time slot has been reached. In some aspects, determining whether the scheduled time slot has been reached may include comparing a current time of the BLE device with the scheduled time slot, or may include receiving a signal indicating that the scheduled time slot has been reached.

At step 620, BLE device A exits sleep mode and wakes up at the scheduled time slot. In some aspects, waking up may refer to powering up all functions that were powered down during sleep mode, or may include powering up only a portion of those functions. For example, BLE device A may wake up by powering up only its communication functions, but leaving other functions, such as data collection functions, powered down.

At block 630, BLE device A broadcasts the data to its child nodes B, C, and D. In some aspects, the broadcast data packet may have a format as described above with respect to FIG. 5. After broadcasting the data to child nodes B, C, and D, BLE device A may wait for acknowledgement packets from these child nodes. In some aspects, the acknowledgement packets may have a format as described above with respect to FIG. 5. In some aspects, a timeout parameter may be provided and may indicate and an amount of time that a BLE devices is to wait for acknowledgement packets from the child nodes. At block 640, BLE device A determines whether the timeout value specified by the timeout parameter has been reached, or whether acknowledgement packets have been received from all child nodes to which the data packet was broadcast. If the timeout is reached, or if acknowledgement packets are received from all child nodes to which the data packet was broadcast, the BLE device may enter sleep mode again. In some aspects, the timeout value may be smaller than a time limit allowed for data exchange between any pair of BLE devices (e.g., the timeout value may be smaller than the value of Th in Equation 2 above).

At block 650, BLE devices B, C, and D may be in sleep mode. BLE devices B, C, and D may have a scheduled time slot for receiving data from parent BLE device A. In some aspects, the data from parent BLE device A may be addressed to a descendant of any of BLE devices B, C, and D. For example, the data from parent BLE device A may be addressed to a child node of BLE device D. At block 660, while in sleep mode, BLE devices B, C, and D determine whether the scheduled time slot has been reached. In some aspects, determining whether the scheduled time slot has been reached may include comparing a current time of the BLE device with the scheduled time slot, or may include receiving a signal indicating that the scheduled time slot has been reached.

At block 670, BLE devices B, C, and D exit sleep mode begin scanning for a broadcast packet from parent BLE device A. In some aspects, waking up may refer to powering up all functions that were powered down during sleep mode, or may include powering up only a portion of those functions. For example, BLE device A may wake up by powering up only its communication functions, but leaving other functions, such as data collection functions, powered down.

At block 680, BLE devices B, C, and D receive a broadcast data packet from parent BLE device A. In some aspects, the broadcast data packet may have a format as described above with respect to FIG. 5. At block 690, after receiving the broadcast data packet, BLE devices B, C, and D generate and broadcast an acknowledgement packet to parent BLE device a. In some aspects, the acknowledgement packet may be broadcast for a predetermined period, or until a timeout condition has been reached. In aspects, the predetermined period may be smaller than the timeout value. The acknowledgement packets may have a format as described above with respect to FIG. 5. Once the broadcasting period is expired, each of BLE devices B, C, and D may enter sleep mode again.

Figure 7A:
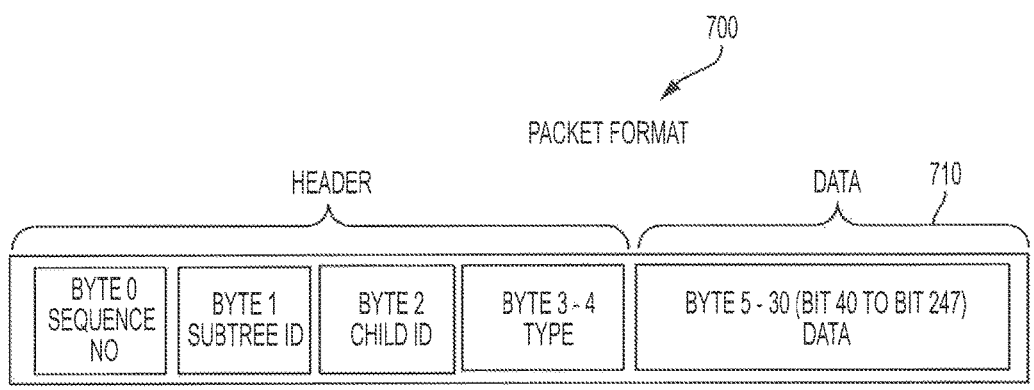
FIG. 7a shows an exemplary format for a user defined payload section of a BLE broadcast packet formatted in accordance with the aspects of the present disclosure.
Figure 7B:
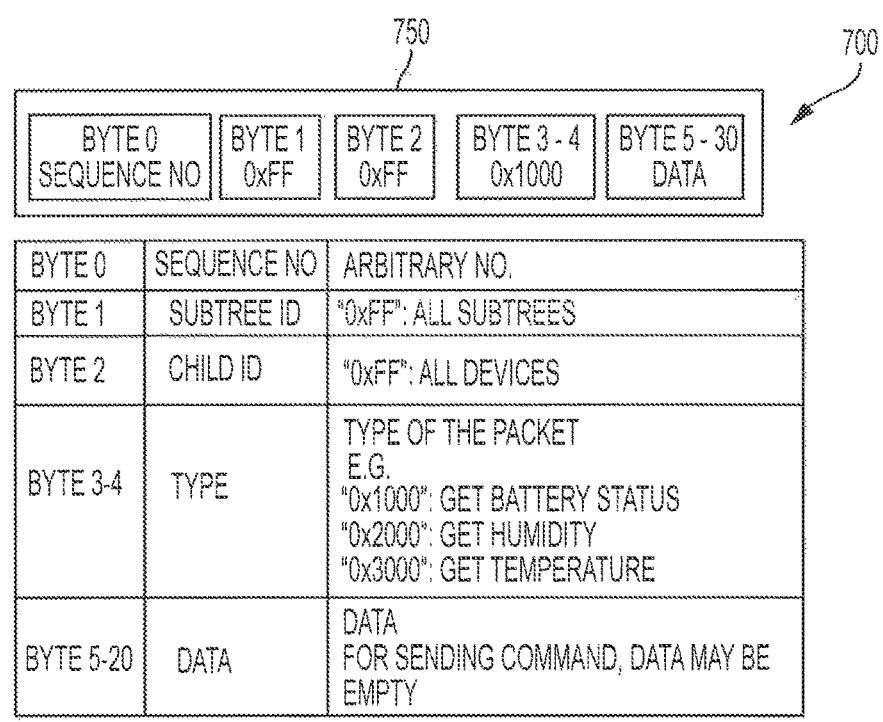
FIG. 7b shows an exemplary format for a user defined payload section of a BLE broadcast packet formatted in accordance with the aspects of the present disclosure.

Referring to FIG. 7a, a packet format for BLE user defined payload 700 of a BLE broadcast packet is shown. It is noted that user defined payload 700 of FIG. 7a may correspond to Data field 530 of PDU section 520 of BLE broadcast packet 510 of FIG. 5. In aspects, BLE user defined payload 700 may comprise a maximum of 31 bytes and may be user defined. It is noted however, that the BLE user defined payload 700 may, in some aspects, comprise more than or less than 31 bytes. In aspects, data of a BLE device may be represented by a single bit (e.g., "on"/"off"). In aspects, data of a BLE device may be represented by more than one bit. Utilizing more bits to represent data of a BLE device may enable more complex data to be provided by the BLE devices. In some aspects, the size of the data is the same for all BLE devices in a BLE network. According to aspects of the present disclosure, when reporting data from BLE devices in a BLE network, instead of creating a new packet for each BLE device, BLE devices may aggregate data in a single packet to be sent to the gateway. The technique disclosed herein will result in a reduction of the network load, while preserving the same amount of information transmitted.

The format of BLE user defined payload 700 may be in accordance to the format described above with respect to FIG. 5. BLE user defined payload 700 may include a header, with a sequence field, a subtree ID field, a child ID field, a type field, and may also include data section 710. In some aspects, data section 710 may comprise bytes 5-30, or bits 40-247, of BLE user defined payload 700.

In some aspects, data of a BLE device may be aggregated into an existing BLE broadcast packet by inserting the data into a specific portion of data section 710 of BLE user defined payload 700, while maintaining any previously inserted data from other descendant BLE devices. In these aspects, a BLE broadcast packet may be received from a child BLE device by a parent BLE device. The BLE broadcast packet may include data of the child BLE device in the data section. In some aspects, the BLE broadcast packet may further include data of any descendant BLE devices of the parent BLE device. For example, with reference to FIG. 1, a BLE broadcast packet may be received by BLE device 150a of node A from BLE device 150d of node D. In this example, the BLE broadcast packet received by BLE device 150a may include data, in the data section, of BLE device 150d and may also include data of BLE device 150e, which is a descendant child of BLE device 150a.

Referring back to FIG. 7a, a BLE device aggregating data into data section 710 of BLE user defined payload 700 may find the specific portion of data section 710 to insert the data using the following equation:

$$[Sb, Eb] = [h+(n-1l)*d, h+(n*d)-1] \quad \text{(Equation 3)}$$

where:
[Sb, Eb]=the portion of the data section of the BLE user defined payload to insert the data, Sb being the starting bit and Eb being the ending bit;
h=a size of the header of the BLE user defined payload in bits;
n=a Child ID of the BLE device inserting the data; and
d=size of the data status of the BLE devices in the BLE network in bits.

It is noted that in some aspects, the maximum number of BLE devices supported by a subtree is given by (s−h)/d, where s=size of the BLE user defined payload.

FIG. 8, shows an example illustrating the application of equation (3) for finding the portion of data section 710 of BLE user defined payload 700 to aggregate data of BLE devices A-E in a single BLE broadcast packet for reporting the data to gateway 120. In this example, each of BLE devices A-E may use 2 bits to represent its data, and all BLE devices A-E may have the same value "01." BLE devices A, B, C, D, and E may have child IDs 1, 2, 3, 4, and 5, respectively, and the header size of the user defined payload may be 40 bits. In this example, BLE device E may generate broadcast packet 810 and, using equation (3) may determine that its data may be inserted into bits [40+(5-1)*2, 40+(5*2)-1]=[48, 49]. BLE device E may insert the value "01" into bits [48, 49] of the user defined payload of broadcast packet 810 and may initiate a broadcast of broadcast packet 810 to BLE device D.

BLE device D may receive broadcast packet 810 from BLE device E, including the data of BLE device E in bits [48, 49] of the user defined payload. BLE device D may use using equation (3) to determine that its data may be inserted into bits [40+(4-1)*2, 40+(4*2)-1]=[46, 47]. BLE device E may insert the value "01" into bits [46, 47] of the user defined payload of the broadcast packet 812 without changing the values in bits [48, 49], which correspond to the data of BLE device E. BLE device D may then initiate a broadcast of broadcast packet 812, which includes aggregated data of BLE device D and E, to BLE device A. Using the same process described above, BLE devices B and C generate and initiate broadcasts of broadcast packets 814 and 816, including data, to BLE device A.

BLE device A may receive broadcast packets 812, 814, and 816 from BLE devices D, C and B, respectively, including the data of BLE device E in bits [48, 49], the data of BLE device D in bits [46, 47], the data of BLE device C in bits [44, 45], and the data of BLE device B in bits [42,43] of the user defined payload. BLE device A may use using equation (3) to determine that its data may be inserted into bits [40+(1−1)*2, 40+(1*2)−1]=[40, 41] of the user defined payload. BLE device A may insert the value "01" into bits [40, 41] of the user defined payload of the broadcast packet 812 without changing the values in bits [42, 49], which correspond to the data of BLE devices B-E. BLE device A may then broadcast single broadcast packet 818, which includes aggregated data of BLE device A-E to gateway 120.

It is noted that, without the application of the techniques disclosed herein, each BLE device, upon receiving a broadcast packet from a child node reporting data, would generate a new broadcast packet to transmit the child node's data. The BLE device would then create another broadcast packet to report its own data. Thus, without the application of the techniques disclosed herein, reporting the data of all BLE devices A-E would require using at least 9 broadcast packets. Using the aggregation techniques disclosed herein, data of all BLE devices A-E may be reported using only 5 broadcast packets 810-818.

According to another aspect of the present disclosure, a technique for securing a data exchange between BLE devices is provided. In order to enhance the security and defend against unauthorized access of the broadcast data, data packets may be encrypted and decrypted during the data exchange between the BLE devices. It is noted that the techniques disclosed herein for securing a data exchange between BLE devices may be applied to the data exchange operations, and data aggregation operations described above. In some aspects, encrypting a broadcast packet may include encrypting the entire broadcast packet. In additional aspects, encrypting (and also decrypting) a broadcast packet may include encrypting (or decrypting) only a portion of the broadcast packet. For example, only the user defined payload of a broadcast packet may be encrypted. Encrypting and decrypting only the contents of the user defined payload (e.g., the data generated by the BLE device) may reduce power consumption of the BLE device while protecting the important aspects of the data transmission, namely, the data generated by the BLE device.

Figure 9A:
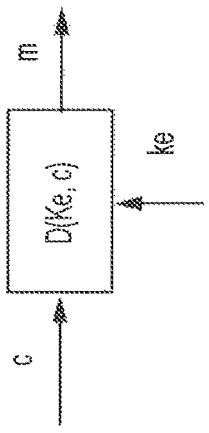
FIG. 9a shows a block diagram illustrating encryption of data exchanged between BLE devices according to aspects of the present disclosure.

Referring to FIG. 9a, a function E(Ke, m) for encrypting a packet by a BLE device is shown, where m is the payload to be encrypted, and Ke is an evolving encryption key that may be derived by the BLE device. In some aspects, a BLE device may apply the encryption function to a broadcast packet to be transmitted, and then broadcasts the encrypted packet. In some aspects, the broadcast packet to be encrypted may be a packet generated by the BLE device, or may be a packet received from another BLE device. In aspects, the packet to be encrypted may be a packet previously decrypted by the BLE device from an encrypted packet received from another BLE device.

Figure 9B:
FIG. 9b is a block diagram illustrating decryption of data exchanged between BLE devices according to aspects of the present disclosure.

Referring to FIG. 9b, a function D(Ke, c) for decrypting a packet by a BLE device is shown, where c is the encrypted data to be decrypted, and Ke is an evolving encryption key that may be derived by the BLE device. In some aspects, a BLE device may apply the decryption function to a broadcast packet received from another BLE device. In some aspects, after decrypting a packet, a BLE device may aggregate data into the decrypted packet. In some aspects, no data is aggregated by the BLE device. In aspects, the BLE device re-encrypts the decrypted packet, using an encryption function, and broadcasts the re-encrypted packet.

Evolving encryption key Ke that is used by the BLE devices in the encrypting and decrypting functions may be derived by a BLE device using the following equation:

$$Ke=<k\|t\|X> \qquad \text{(Equation 4)}$$

where:
k=a shared key available to each BLE device in the BLE network;
t=a time value from the BLE device clock; and
X=the address of the BLE device encrypting, or the address of the BLE device that encrypted the packet to be decrypted.

In some aspects, the shared key may be a 128 bit encryption key known to all BLE devices in the BLE network. The shared key may be part of the configuration information stored in the cloud server, and/or may be stored in each BLE device in the BLE network. In some aspects, the time value may be obtained from the clock of the BLE device. In other aspects, the time value may be provided by other devices within the BLE network. In aspects, the time value may be in milliseconds from 1970. In aspects, the last n bits may be truncated and padded with 0s to form a 128 bit key. For example, Nov. 30, 2016, corresponds to a value of 1,480,469,420,000 milliseconds, which may be expressed as 1010110001011000101101101010010111111000000$_2$. For n=13, the last 13 bits may be truncated, and the value is padded with 0s to 128 bits. For n=13, a time difference tolerance of 2^13=8,192 milliseconds is achieved.

In aspects, the address of the BLE device may be a Bluetooth address, which may be expressed as a 6-byte value. In other aspects, the address of the BLE device may be any format that is addressable by another BLE device.

Figure 9C:
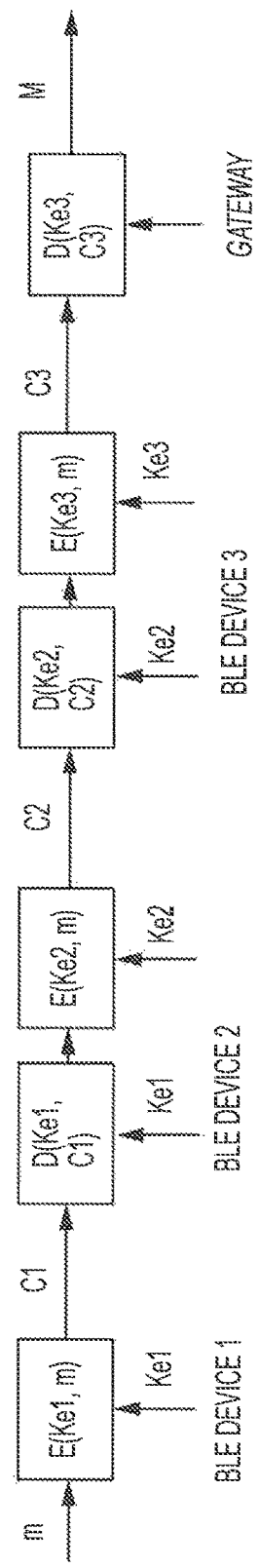
FIG. 9c is a block diagram illustrating encryption and decryption of data exchanged between BLE devices according to aspects of the present disclosure.

During operation, a child BLE device of a BLE network may have data to be reported to the gateway. For example, with reference to FIG. 9c, BLE device 1, which may be a child of BLE device 2, and a descendant of BLE device 3, may have data to be reported to the gateway. The data may be included in payload m, scheduled for transmission to BLE device 2. Before payload m is broadcast to BLE device 2, BLE device 1 may derive evolving encryption key Ke1, using equation (4), based at least in part on the shared key, a time value of BLE device 1, and the address of BLE device 1. BLE device 1 may then encrypt payload m using the evolving encryption key to generate encrypted packet C1. BLE device 1 may broadcast encrypted packet C1 to BLE device 2.

BLE device 2 receives encrypted packet C1 from BLE device 1. BLE device may derive evolving encryption key Ke1, using equation (4), based at least in part on the shared key, a time value of BLE device 2, and the address of BLE device 1. BLE device 2 applies the decryption function to encrypted packet C1 to generate a decrypted packet. In aspects, BLE device 2 may aggregate status into the decrypted packet. In other aspects, BLE device 2 may not aggregate status into the decrypted packet. Before the packet is broadcast to BLE device 3, BLE device 2 may derive evolving encryption key Ke2, using equation (4), based at least in part on the shared key, a time value of BLE device 2, and the address of BLE device 2. BLE device 2 may then re-encrypt the decrypted packet using evolving encryption key Ke2 to generate encrypted packet C2. BLE device 2 may broadcast encrypted packet C2 to BLE device 3.

It is noted that, when decrypting encrypted packet C1, a time value of BLE device 2 may be used. As noted above, the time value may be a value of "n" bits, truncated, from a real time clock of BLE device 2. In aspects, there may be a time difference between the time value used by BLE device 1 to generate encrypted packet C1 and the time value used by BLE device 2 in decrypting encrypted packet C1, due to time errors in the real-time clock of the BLE devices and the time elapsed between encryption of the payload by BLE device 1 and decrypting the encrypted packet by BLE device 2. In aspects, a tolerance may be provided to account for the time difference between the clocks of BLE device 1 and BLE device 2. The tolerance may be accounted for by truncating the time value used to encrypt the payload. For example, for n=13, may provide a time tolerance of 2^13=8,192 milliseconds. In aspects, the time tolerance may be configured to be larger than the time difference to ensure that the encryption and decryption algorithms are not affected by the time differences in the time values of the real-time clocks of the BLE devices, thus enabling encryption and decryption operations to be performed despite the time difference.

At BLE device 3, the process may be repeated, wherein encrypted packet C2 may be decrypted, an evolving encryption key Ke3 may be derived and used to re-encrypt the packet to generate encrypted packet C3, which may then be broadcast to the gateway. In some aspects, the gateway may derive evolving encryption key Ke2 and decrypt encrypted packet C3.

Figure 10:
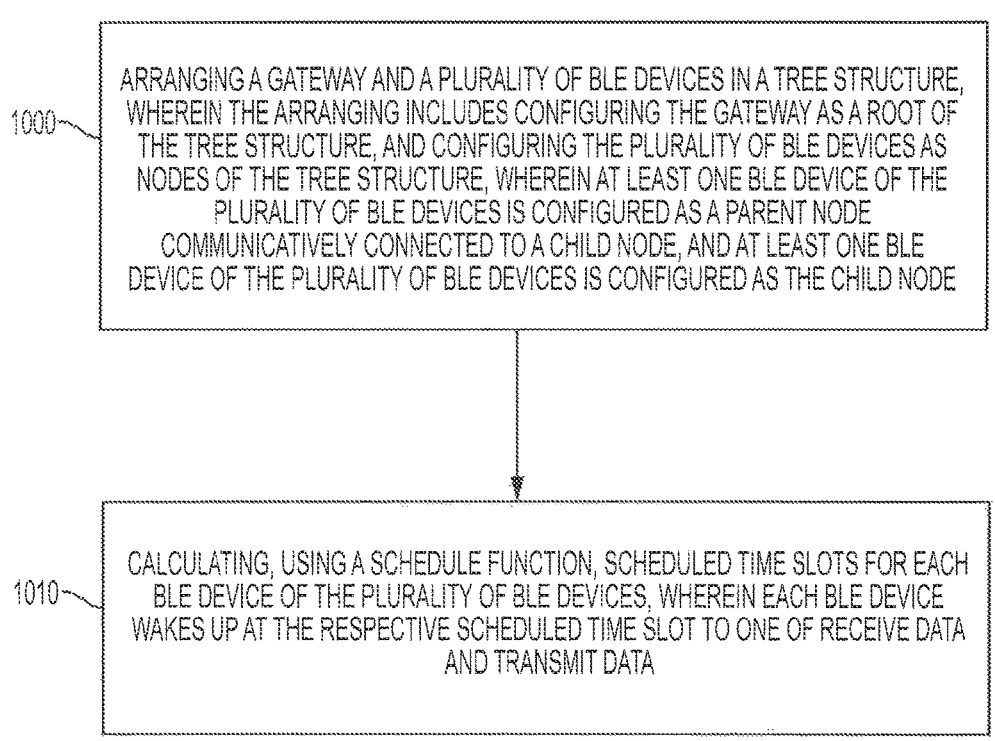
FIG. 10 is functional block diagram illustrating example blocks executed to implement aspects of the present disclosure.

FIG. 10 is a functional block diagram illustrating example blocks executed to implement one aspect of the present disclosure. At block 1000, a gateway and a plurality of BLE devices may be arranged in a tree structure. Arranging the gateway and the plurality of BLE devices in a tree structure may include configuring the gateway as a root of the tree structure and configuring the plurality of BLE devices as nodes of the tree structure. At least one BLE device of the plurality of BLE devices may be configured as a parent node and at least one BLE device of the plurality of BLE devices may be configured as a child node. The parent node and the child node may be communicatively connected.

At block 1010, a schedule function may be used to calculate scheduled time slots for each BLE device of the plurality of BLE devices. Each BLE device may wake up at the respective scheduled time slot to either receive data or to transmit data. The data may be received from or transmitted to another node, or may be received from or transmitted to the gateway.

Figure 11:
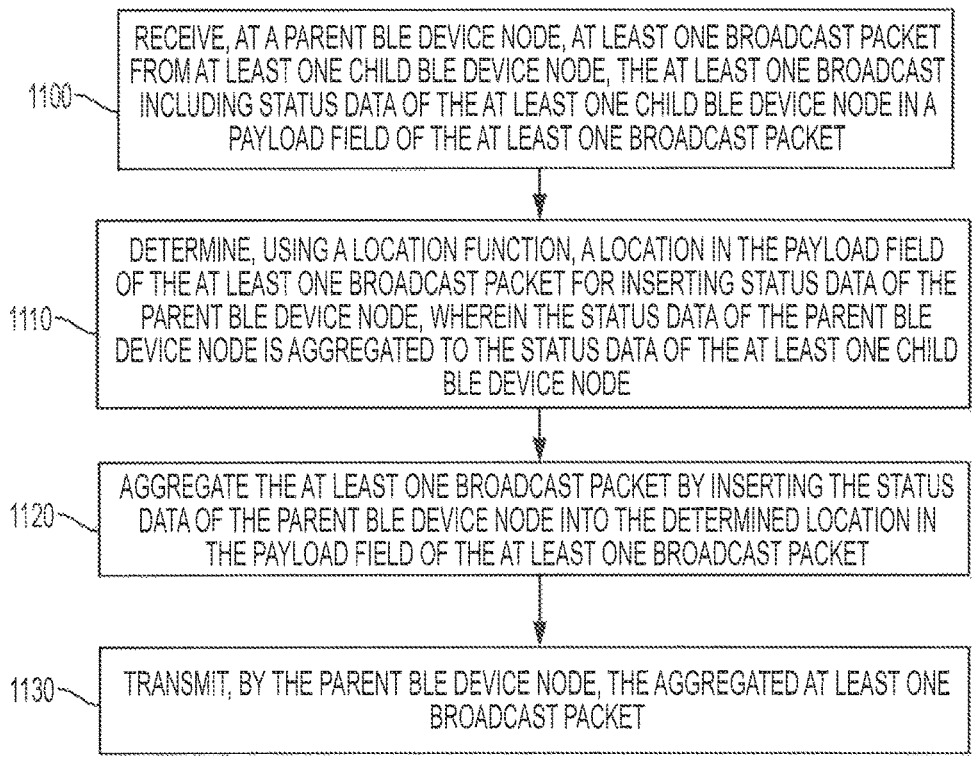
FIG. 11 is functional block diagram illustrating example blocks executed to implement aspects of the present disclosure.

FIG. 11 is a functional block diagram illustrating example blocks executed to implement one aspect of the present disclosure. At block 1100, a parent BLE device node may receive at least one broadcast packet from at least one child BLE device node. The broadcast packet from the child BLE device node may include data of the child BLE device node in a payload field. At block 1110, a location function may be used to determine a location in the payload field of broadcast packet for inserting data of the parent BLE device node. The data of the parent BLE device node may be aggregated to the data of the at least one child BLE device node.

At block 1120, the broadcast packet may be aggregated by inserting the data of the parent BLE device node into the determined location in the payload field of the broadcast packet. At block 1130, the parent BLE device node may transmit the aggregated broadcast packet.

Figure 12:
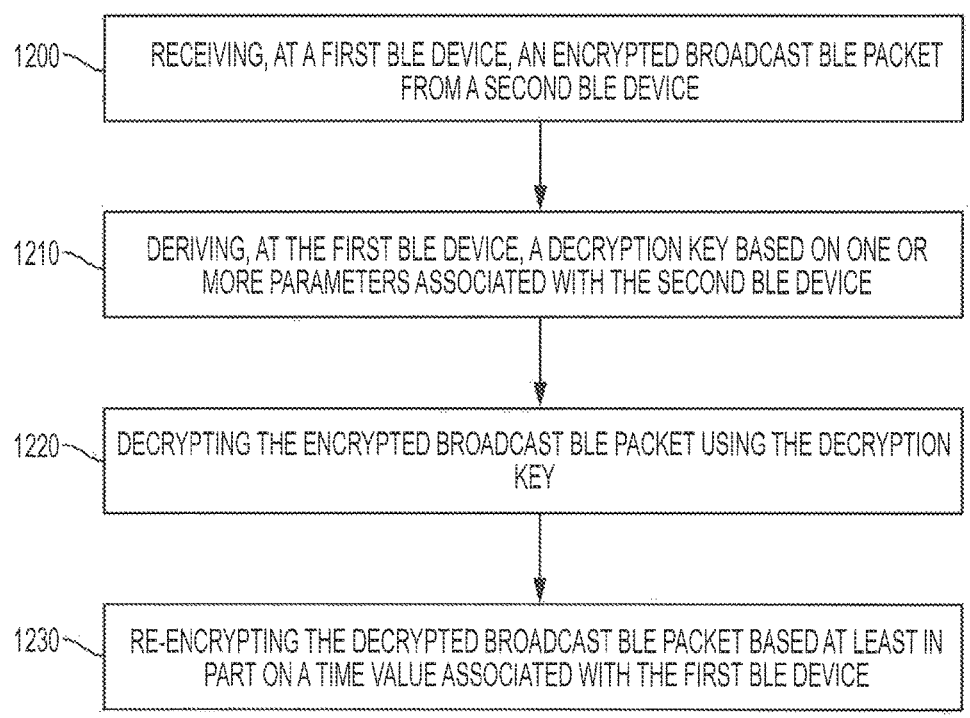
FIG. 12 is functional block diagram illustrating example blocks executed to implement aspects of the present disclosure.

FIG. 12 is a functional block diagram illustrating example blocks executed to implement one aspect of the present disclosure. At block 1200, a first BLE device may receive an encrypted broadcast BLE packet from a second BLE device. At block 1210, the first BLE device may derive a decryption key based on one or more parameters associated with the second BLE device. In some aspects, the one or more parameters associated with the second BLE device may include at least one of a time value, a Bluetooth address of the second BLE device, and a shared key.

At block 1220, the encrypted broadcast BLE packet may be decrypted using the decryption key. At block 1230, the decrypted broadcast BLE packet is re-encrypted based at least in part on a time value associated with the first BLE device. In some aspects, data of the first BLE device is aggregated into the payload of the broadcast BLE packet prior to the broadcast packet being re-encrypted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 1, 2, 4, 6, 8, and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed:

1. A system comprising:
a plurality of Bluetooth low energy (BLE) devices configured as nodes of a tree structure, the plurality of BLE devices including at least a first BLE device and a second BLE device, wherein the first BLE device is configured as a parent node of the tree structure, and the second BLE device is configured as a child node of the first BLE device within the tree structure, wherein the first BLE device is configured to:
  receive, from the second BLE device, a first BLE packet including a payload field carrying data of one or more other BLE devices;
  determine, using a location function, a location within the payload field of the first BLE packet for inserting data of the first BLE device;
  aggregate the data of the first BLE device with the data of the one or more other BLE devices to generate a second BLE packet that includes a payload field comprising aggregated data, wherein the data of the first BLE device is aggregated with the data of the one or more other BLE devices by inserting the data of the first BLE device into the determined location within the payload field of the first BLE packet; and
  broadcast the second BLE packet.

2. The system of claim 1, further comprising:
at least one electronic device configured to determine configuration information associated with the plurality of BLE devices, the configuration information defining at least an arrangement of the plurality of BLE devices within the tree structure; and
a gateway configured as a root node of the tree structure.

3. The system of claim 2, wherein the at least one electronic device is a BLE-enabled device, and wherein the at least one electronic device configures each BLE device of the plurality of BLE devices as nodes of the tree structure using the configuration information by communicating with each of the plurality of BLE devices directly in accordance with a BLE communication protocol.

4. The system of claim 2, wherein the configuration information includes at least one of: a subtree identification (ID), a child node ID, a parent node Bluetooth address, a child node Bluetooth address, sibling nodes IDs, descendant child nodes IDs, a real time, a distance to gateway, and a secure key.

5. The system of claim 2, wherein determining the configuration information that defines the tree structure includes ensuring that a connection between the parent node and the child node has a signal strength that satisfies a threshold signal strength.

6. The system of claim 5, wherein the threshold signal strength has a value of −100 dBm, and wherein the threshold signal strength is pre-determined.

7. The system of claim 5, wherein determining the configuration information further comprises minimizing a number of BLE devices in the plurality of BLE devices to be configured as nodes of the tree structure, wherein the minimizing includes determining a number of BLE devices in the plurality of BLE devices such that the signal strength of a connection between any BLE device of the plurality of BLE devices and another BLE device of the plurality of BLE devices has a signal strength that satisfies the threshold signal strength.

8. The system of claim 2, wherein each BLE device of the plurality of BLE devices calculates, using a schedule function, a scheduled time slot for exchanging data, wherein each BLE device wakes up at the respective scheduled time slot to receive data, transmit data, or both.

9. The system of claim 8, wherein the data is received from or transmitted to, at the respective time slot, one of another BLE device and a gateway.

10. The system of claim 8, wherein at least two BLE devices of the plurality of BLE devices are configured as child nodes of the first BLE device, and wherein the at least two BLE devices calculate respective scheduled time slots with packet collision avoidance by adding a random time to each respective scheduled time slot, whereby the respective scheduled time slots for the at least two BLE devices are different.

11. The system of claim 8, wherein the schedule function for calculating a scheduled time slot for broadcasting data by a particular BLE device of the plurality of BLE devices is defined by:

$$T_n = T_g + T_h * d_n$$

wherein:
- $T_n$ = scheduled time slot for data exchange by the particular BLE device,
- $T_g$ = a time for transmitting the data to the gateway,
- $T_h$ = a time limit allowed for data exchange between any pair of BLE devices, and
- $d_n$ = number of hops between the particular BLE device and the gateway.

12. The system of claim 8, wherein the schedule function for calculating a scheduled time slot for receiving data at by a particular BLE device of the plurality of BLE devices is defined by:

$$T_n = T_g - T_h * d_n$$

wherein:
- $T_n$ = scheduled time slot for data exchange by the particular BLE device,
- $T_g$ = a time for receiving data from the gateway,
- $T_h$ = a time limit allowed for data exchange between any pair of BLE devices, and
- $d_n$ = number of hops between the particular BLE device and the gateway.

13. The system of claim 1, wherein a maximum number of BLE devices for which data can be aggregated in a particular BLE packet is determined based on: $(s-h)/d$, wherein:
- s = size of the BLE packet,
- d = a size of the s data to be reported by each BLE device of the maximum number of BLE devices, and
- h = a size of a header of the BLE packet.

14. The system of claim 1, wherein the location function is defined by $[S_b, E_b] = [h+(n-1)*d, h+(n*d)-1]$, wherein:
- $[S_b, E_b]$ = the location in the payload field of the first BLE packet for inserting the data of the first BLE device, $S_b$ being a starting bit of the location and $E_b$ being an ending bit of the location,
- h = a size of a header of the first BLE packet,
- d = a size of the data of the first BLE device, and
- n = an identification number of the first BLE device.

15. The system of claim 1, wherein the first BLE packet is encrypted, and wherein the first BLE device is further configured to:
- derive a decryption key based on one or more parameters associated with the second BLE device;
- decrypt the first BLE packet using the decryption key; and
- re-encrypt the decrypted first BLE packet after aggregating the data of the first BLE device with the data of the one or more other BLE devices to generate the second BLE packet.

16. The system of claim 15, wherein the one or more parameters associated with the second BLE device include a time value, a Bluetooth address of the second BLE device, and a shared key.

17. The system of claim 16, wherein the first BLE device is further configured to re-encrypt based at least in part on one or more parameters associated with the first BLE device, the one or more parameters including at least a Bluetooth address of the first BLE device and a shared key.

18. A non-transitory computer-readable medium storing instructions that, when executed by one or more processors, cause the one or more processors to perform operations for communication data according to a Bluetooth low energy (BLE) protocol, the operations comprising:
- receiving, at a first BLE device of a plurality of BLE devices from a second BLE device of the plurality of BLE devices, a first BLE packet including a payload field carrying data reported by the second BLE device;
- determining, using a location function, a location within the payload field of the first BLE packet for inserting data of the first BLE device;
- aggregating the data of the first BLE device with the data reported by the second BLE device to generate a second BLE packet that includes a payload field comprising aggregated data, wherein the data of the first BLE device is aggregated with the data reported by the second BLE device by inserting the data of the first BLE device into the determined location within the payload field of the first BLE packet; and
- broadcasting the second BLE packet.

19. The non-transitory computer-readable medium of claim 18, wherein the location function is defined by $[S_b, E_b] = [h+(n-1)*d, h+(n*d)-1]$, wherein:
- $[S_b, E_b]$ = the location in the payload field of the first BLE packet for inserting the data of the first BLE device, $S_b$ being a starting bit of the location and $E_b$ being an ending bit of the location,
- h = a size of a header of the first BLE packet,
- d = a size of the data of the first BLE device, and
- n = an identification number of the first BLE device.

20. A method communicating data using Bluetooth Low Energy (BLE) devices, the method comprising:
- receiving, at a first BLE device of a plurality of BLE devices from a second BLE device of the plurality of BLE devices, a first BLE packet including a payload field carrying data reported by the second BLE device;
- determining, using a location function, a location within the payload field of the first BLE packet for inserting data of the first BLE device;
- aggregating the data of the first BLE device with the data reported by the second BLE device to generate a second BLE packet that includes a payload field comprising aggregated data, wherein the data of the first BLE device is aggregated with the data reported by the second BLE device by inserting the data of the first BLE device into the determined location within the payload field of the first BLE packet; and
- broadcasting the second BLE packet.

* * * * *

UNITED STATES PATENT AND TRADEMARK OFFICE
CERTIFICATE OF CORRECTION

PATENT NO. : 10,039,057 B1
APPLICATION NO. : 15/615402
DATED : July 31, 2018
INVENTOR(S) : Tak Wing Lam et al.

Page 1 of 1

It is certified that error appears in the above-identified patent and that said Letters Patent is hereby corrected as shown below:

In the Specification

At Column 6, Line number 40, delete "the Child II)" and replace with --the Child ID--.
At Column 16, Line number 34, delete "[Sb, Eb] = [h+(n-1*l*)*d, h+(n*d)-1]" and replace with --[Sb, Eb] = [h+(n-1)*d, h+(n*d)-1]--.
At Column 18, Line number 33, delete "Os" and replace with --0s--.
At Column 18, Line number 38, delete "Os" and replace with --0s--.

Signed and Sealed this
Fourth Day of September, 2018

Andrei Iancu
*Director of the United States Patent and Trademark Office*